United States Patent
Murouchi et al.

(10) Patent No.: US 7,790,055 B2
(45) Date of Patent: Sep. 7, 2010

(54) WHOLLY AROMATIC LIQUID CRYSTAL POLYESTER COMPOSITION AND OPTICAL PICKUP LENS HOLDER USING SAME

(75) Inventors: Satoshi Murouchi, Kanagawa (JP); Toshio Nakayama, Kanagawa (JP)

(73) Assignee: Nippon Oil Corporation, Kanagawa (JP)

( * ) Notice: Subject to any disclaimer, the term of this patent is extended or adjusted under 35 U.S.C. 154(b) by 0 days.

(21) Appl. No.: 12/307,025

(22) PCT Filed: Jun. 28, 2007

(86) PCT No.: PCT/JP2007/063404

§ 371 (c)(1),
(2), (4) Date: Oct. 21, 2009

(87) PCT Pub. No.: WO2008/004599

PCT Pub. Date: Jan. 10, 2008

(65) Prior Publication Data

US 2010/0065777 A1     Mar. 18, 2010

(30) Foreign Application Priority Data

Jul. 3, 2006   (JP) .............................. 2006-183369

(51) Int. Cl.
    C09K 19/00    (2006.01)
    C09K 19/06    (2006.01)
    C09K 19/52    (2006.01)
    C08J 9/32     (2006.01)

(52) U.S. Cl. ..................... 252/299.01; 430/20; 523/218

(58) Field of Classification Search ............ 252/299.01, 252/299.1; 430/20; 523/218
    See application file for complete search history.

(56) References Cited

U.S. PATENT DOCUMENTS 6,376,076 B1 *   4/2002   Ohbe et al. ................. 428/402
2002/0017631 A1  2/2002   Maeda et al.

FOREIGN PATENT DOCUMENTS

| JP | 2003020385 | 1/2003 |
| JP | 2003211443 | 7/2003 |
| JP | 2005089652 | 4/2005 |

* cited by examiner

*Primary Examiner*—Geraldina Visconti
(74) *Attorney, Agent, or Firm*—Weingarten, Schurgin, Gagnebin & Lebovici LLP

(57) ABSTRACT

A wholly aromatic liquid crystal polyester resin composition for injection molding, formed by melt-kneading 100 parts by mass of a wholly aromatic liquid crystal polyester resin, and 5 to 20 parts by mass of glass fibers having a number average diameter of 5 to 20 μm and an aspect ratio of 5 or more, the wholly aromatic liquid crystal polyester resin being formed by polycondensation of 60 to 70 mol % of p-hydroxybenzoic acid, 40 to 30 mol % of terephthalic acid and 4,4'-dihydroxydiphenyl combined, and 0 to 5 mol % of isophthalic acid and/or terephthalic acid (for all of these, derivatives thereof are included, and the total of these is 100 mol %). This composition has excellent damping properties, and is suitable for a molding material of an optical pickup lens holder for short type pickups for use in high-speed DVD systems and playback pickups for use in Blu-ray systems.

4 Claims, No Drawings

WHOLLY AROMATIC LIQUID CRYSTAL POLYESTER COMPOSITION AND OPTICAL PICKUP LENS HOLDER USING SAME

TECHNICAL FIELD

The present invention relates to a wholly aromatic liquid crystal polyester resin composition used in an optical pickup lens holder for an information recording and playback device, and an optical pickup lens holder which includes an injection molded product of such resin composition as a structural component.

BACKGROUND ART

Optical pickups record information on the surface of a disc, such as a compact disc, laser disc, video disc, or an optical magnetic disc, and read the information recorded on such a disc, by irradiating semiconductor laser light focused to a spot of several μm in diameter by a lens. Optical pickups are usually composed of optical elements, such as a light emitting element, a light receiving element, and a mirror, an optical frame which fixes these elements, an object lens, an object lens holder (hereinafter, simply referred to as a "lens holder"), an actuator member for tracking such parts to the movement of the optical disc, and a base frame which holds the actuator member and forms an optical path with the optical frame.

To advance weight and cost reduction of optical pickups, attempts are being made to switch the component materials from metal to resin. Even among thermoplastic resins, attention has especially been paid to liquid crystal polyester resins for optical pickup components, such as lens holders and base frames, due to their excellent mechanical properties, moldability, dimensional accuracy, heat resistance, and damping properties. However, with the increasing volume and recording/reading speed of information handled by recent digital disc drive apparatuses, the requirements for the damping properties have become stricter. In addition, high performance properties are also now required even for the liquid crystal polyester resin compositions forming the components of the optical pickup.

Especially for recent DVD and Blu-ray devices, the requirements have become stricter. For DVD high-speed recording systems, the resin components need to have a specific gravity of 1.4 to 1.5. Especially for the short pickups mounted in notebook computers, high damping properties with an even higher resonant frequency and loss coefficient, and an excellent balance between these, are required. For Blu-ray recording systems, a specific gravity of 1.3 or less is preferred, while for playback systems, a specific gravity of 1.5 or less is preferred, and high resonant frequency and high loss coefficient are desired. Specifically, when the resonant frequency is 2500 Hz or more, the loss coefficient is preferably 0.15 or more.

Conventionally, there have been several proposals for liquid crystal polyester resin compositions suited for a component forming an optical pickup. For example, a resin composition has been proposed which has 100 parts by weight of liquid crystal polyester and 5 to 20 parts by weight of glass fibers which have a post-molding number average fiber diameter of 2 to 20 μm and a post-molding number average fiber length of 210 to 500 μm (see Patent Document 1). Another example which has been proposed is a resin composition which includes 100 parts by weight of wholly aromatic liquid crystal polyester, which has a melting point of 400° C. or more or a liquid crystal starting temperature in which the apparent viscosity at a temperature 20° C. above of this temperature is 1000 poise or more, and 5 to 100 parts by weight of glass fibers which have a number average fiber length of 50 to 200 μm (see Patent Document 2). However, with these resin compositions, a resin having low specific gravity and high damping properties cannot be obtained, and thus these resin compositions cannot meet the requirements for short type pickups for use in high-speed DVD systems and playback pickups for use in Blu-ray systems.

Patent Document 1: Japanese Patent Application Laid-Open No. 2001-288342
Patent Document 2: Japanese Patent Application Laid-Open No. 2005-89652

DISCLOSURE OF THE INVENTION

It is an object of the present invention to provide means for resolving, for an optical pickup lens holder, the strict damping properties which are required in short type pickups for use in high-speed DVD systems and playback pickups for use in Blu-ray systems, by using a polyester resin composition which is compounded with a specific liquid crystal polyester resin and a specific filler.

Specifically, a first aspect of the present invention relates to a wholly aromatic liquid crystal polyester resin composition for injection molding, formed by melt-kneading 100 parts by mass of a wholly aromatic liquid crystal polyester resin, and 5 to 20 parts by mass of glass fibers having a number average diameter of 5 to 20 μm and an aspect ratio of 20 or more, the wholly aromatic liquid crystal polyester resin being formed by polycondensation of 60 to 70 mol % of p-hydroxybenzoic acid, 40 to 30 mol % of terephthalic acid and 4,4'-dihydroxydiphenyl combined, and 0 to 5 mol % of isophthalic acid and/or hydroquinone (for all of these, derivatives thereof are included, and the total of these is 100 mol %).

A second aspect of the present invention relates to the wholly aromatic liquid crystal polyester resin composition for injection molding of the first aspect of the present invention, characterized in that the wholly aromatic liquid crystal polyester resin composition has a specific gravity of 1.40 to 1.50, and the glass fibers in the composition has a number average length of 200 μm or less.

A third aspect of the present invention relates to an optical pickup lens holder formed by injection molding the wholly aromatic liquid crystal polyester resin composition for injection molding of any of the first and second aspects of the present invention.

According to the wholly aromatic liquid crystal polyester resin composition for injection molding of the present invention, an optical pickup lens holder can be obtained having a resonant frequency of 2500 Hz or more, a loss coefficient of 0.15 or more, and a specific gravity of 1.40 to 1.50. This resin composition can provide an optical pickup which satisfies the performance required for short type pickups for use in high-speed DVD systems and playback pickups for use in Blu-ray systems.

BEST MODE FOR CARRYING OUT THE INVENTION

The present invention will now be described in more detail.

The wholly aromatic liquid crystal polyester resin used in the present invention uses 60 to 70 mol % of p-hydroxybenzoic acid, 40 to 30 mol % of terephthalic acid and 4,4'-dihydroxydiphenyl combined, and 0 to 5 mol % of isophthalic acid and/or hydroquinone (for all of these, derivatives thereof are included; and below, unless stated otherwise, derivates are included), and is obtained by polycondensation of a raw material in which the total of these is 100 mol %. The combined total of the terephthalic acid and 4,4'-dihydroxydiphenyl may be 40 to 30 mol %. This therefore includes the case where either of these is 0%. Preferably, terephthalic acid is 10 to 20 mol % and 4,4'-dihydroxydiphenyl is 10 to 20 mol %. Depending on the required performance, isophthalic acid and/or hydroquinone may be suitably used as an optional component. As such derivatives, although any well-known derivative may be used, preferred are derivates which have a phenolic hydroxyl group acylated, for example an acetylated derivative obtained from acetic acid or acetic anhydride, or a phenyl ester derivative obtained from a phenol. The reason why such compounds are preferred is that their progression in melt polymerization is rapid, side reactions can be suppressed, and the composition of the monomer raw materials is reflected in the molecular structure of the wholly aromatic polyester resin.

The present inventors believe that by having p-hydroxybenzoic acid, terephthalic acid, and 4,4'-dihydroxydiphenyl form 95 to 100 mol % of all the monomers, high rigidity can be provided to the wholly aromatic polyester molecular structure. Furthermore, the present inventors believe that having the molecular structure formed from 60 to 70 mol % of p-hydroxybenzoic acid, which has an especially high effect of providing rigidity, and having a structure in which benzene rings are linked by carbon bonds and ester bonds, synergistically provides a large effect on damping properties for an optical pickup lens holder.

The content of p-hydroxybenzoic acid is especially important. This is because the provision of rigidity is insufficient with a content of less than 60 mol %, while if the content is more than 70 mol %, the melt temperature increases, so that in typical injection molding decomposition or the like occurs or the appearance of the above-described effects on molecular structure in the molded product are insufficient.

To lower the melting point of the wholly aromatic polyester or to lower the injection molding temperature, a monomer which can be combined therewith may be used as an optional component. While many such monomers are well known, in the wholly aromatic liquid crystal polyester of the present invention, to maintain excellent damping properties, it is preferred to use isophthalic acid and hydroquinone. However, such aromatic compounds preferably do not exceed 5 mol %, since the rigidity of the molecular structure decreases or the damping properties deteriorate. Although the reason that these compounds are preferable is not clear, it is presumed that these compounds only have one aromatic ring, so that despite the fact that these compounds are contained, the basic structure in which benzene rings are linked by carbon bonds, ester bonds, or the like is maintained in the molecular structure of the wholly aromatic polyester.

Production of the wholly aromatic liquid crystal polyester of the present invention can be carried out using these monomers by well-known melt polycondensation, or by melt polycondensation and solid-phase polycondensation. In the polycondensation reaction, a catalyst may or may not be used. Catalysts which are conventionally known as a polyester polycondensation catalyst may be used. Examples thereof include metal salts such as magnesium acetate, stannous acetate, tetrabutyl titanate, lead acetate, sodium acetate, potassium acetate, and antimony trioxide, and organic compound catalysts such as N-methylimidazole.

Furthermore, although the polymerization reactor for melt polymerization is not especially limited, it is preferred to select a polymerization reactor equipped with stirring equipment used in common high-viscosity reactions, for example variously-shaped stirrers such as anchor type, multi-stage type, spiral belt, spiral axis or modifications thereof, namely a Werner mixer, a Banbury mixer, a pony mixer, a Muller mixer, a roll mill, a continuously controllable Ko-kneader, a pug mill, a gear compounder and the like.

Glass fibers having an aspect ratio of 5 or more are effective in improving fluidity during injection molding of the wholly aromatic liquid crystal polyester. From the perspective of fluidity during injection molding, glass fibers having a number average diameter of 5 to 20 μm are preferred. From the perspectives of fluidity during injection molding and the surface properties of the molded product, a more preferred average diameter is 7 to 15 μm, and especially preferred is 9 to 12 μm. Glass fibers having a suitable length in consideration of the fact that cutting will occur during the kneading operation are used. A preferred aspect ratio is 20 or more. Either chopped strands or roving may be preferably used. Milled fiber may also be suitably used. Even long fibers such as glass fiber roving may have a suitable fiber length from the cutting according to a typical method during the kneading operation if suitable kneading conditions or kneader is selected. The number average length of the glass fibers in the composition is preferably 200 μm or less. If the number average length is more than 200 μm, a reduction in the loss coefficient occurs, which is not preferable.

The compounding ratio of the glass fibers is 5 to 20 parts by mass with respect to 100 parts by mass of wholly aromatic liquid crystal polyester resin. If the compounding ratio is less than 5 parts by mass, a fluffing phenomenon (formation of fibrils) occurs on the molded article surface, whereby the appearance of the molded article is harmed, which is not preferable. In addition, the external dimensions of the molded article undergo localized changes due to the presence of the fibrils, giving rise to problems in the assembly steps (for example, a winding step) of an electronic part, which is not preferable. If the compounding ratio is more than 20 parts by mass, the loss coefficient deteriorates, which is not preferable.

In the present invention, to the extent that the effects of the present invention are not harmed, other fillers can be compounded. Examples of inorganic fillers which may be used include carbon black; graphite; silica; quartz powder; glass beads; glass powder; silicate esters such as calcium silicate, aluminum silicate, talc, clay, and diatomaceous earth; iron oxide; titanium oxide; zinc oxide; antimony trioxide; alumina; calcium sulfate; other various metal powders; and various metal foils. Examples of organic fillers include heat resistant, high strength fibers comprising such as fluoropolymers, aromatic polyesters, aromatic polyimides, and polyamides.

Furthermore, to the extent that the object of the present invention is not harmed, certain properties can be provided by the addition to the composition of the present invention of common additives or other thermoplastic resins, such as antioxidants and thermal stabilizers (for example, hindered phenols, hydroquinone, and phosphites and their substituted products), UV absorbers (for example, resorcinol, salicylate, benzotriazole, and benzophenone), slip agents and mold release agents (montanic acid and its salt, ester, and half ester, stearyl alcohol, stearylamide, polyethylene wax and the like), coloring agents including dyes (for example, nigrosine) and pigments (for example, cadmium sulfide, phthalocyanine, and carbon black), plasticizers, antistatic agents, and flame retardants.

The wholly aromatic liquid crystal polyester resin composition of the present invention can be obtained by melt kneading methods which are generally used in the subject technical field, and there are no specific restrictions on the production method. Examples of preferred production methods include feeding from a hopper a wholly aromatic liquid crystal polyester resin and glass fibers which were premixed by a mixer, and then kneading and extruding the resultant mixture using a kneading extruder having a pair of double-threaded screws; and melting a wholly aromatic liquid crystal polyester resin which was fed from the hopper, then feeding the glass fibers from an intermediate feed port of the kneading extruder, and kneading and extruding the resultant mixture. This kneading extruder is called a twin-screw extruder. Among such extruders, a co-rotational type having a cutback mechanism which enables uniform dispersion of the filler, and extruders having a cylinder diameter of 40 mm$\phi$ or more with a large gap between the barrel and the screws, which allows the filler to be easily cut into, are preferred. Furthermore, if a kneading extruder having a contact ratio of 1.45 or more with a large gap between screws is used, undesirable damage to the filler, such as glass fibers, can be avoided. As a result, the wholly aromatic polyester resin composition according to the present invention can be efficiently obtained.

The thus-obtained wholly aromatic liquid crystal polyester resin composition has excellent secondary resonant frequency and loss coefficient, and is thus suitable for an optical pickup lens holder member having a thickness of 0.5 mm or less, and preferably 0.3 to 0.05 mm. This wholly aromatic liquid crystal polyester resin composition is especially suitable for short type pickups for use in high-speed DVD systems and playback pickups for use in Blu-ray systems.

EXAMPLES

The present invention will now be described in more detail by the following examples and comparative examples. However, the present invention is not limited to the following examples.

As described below, wholly aromatic liquid crystal polyesters A to F were produced. The wholly aromatic liquid crystal polyesters A to C satisfied the requirements of the present invention, while the wholly aromatic liquid crystal polyesters D to F did not satisfy the requirements of the present invention.

Production Example 1

Production of Wholly Aromatic Liquid Crystal Polyester A (used in Examples 1, 4, and 5, and Comparative Examples 2 and 3)

Melt Polycondensation: 197.5 kg of p-hydroxybenzoic acid (1.43 kilomoles: 65 mol %), 71.7 kg of 4,4'-dihydroxydiphenyl (0.385 kilomoles: 17.5 mol %), 64.0 kg of terephthalic acid (0.385 kilomoles: 17.5 mol %), and 0.06 kg of potassium acetate as a catalyst were charged into a 1700 L polymerization tank (manufactured by Kobe Steel Ltd.) which was made of SUS316 as material and which had a double-helical stirring blade. The polymerization tank was purged with nitrogen by twice injecting nitrogen under vacuum, and then charged with 242.6 kg of acetic anhydride (2.4 kilomoles). An acetylation reaction was then carried out for 2 hours under a reflux state at a stirring blade revolution speed of 45 rpm in which the temperature was increased to 150° C. over 1.5 hours. After the acetylation reaction was finished, the acetic acid was being distilled off. In that state, the temperature was increased by 0.5° C./min, and the polymerization product was extracted at 305° C. from an extraction port at a lower portion of the polymerization tank.

Solid-Phase Polycondensation:

The extracted polymer was solidified by cooling, and then the polymer was pulverized by a pulverizer manufactured by Hosokawa Micron Group to obtain a prepolymer. The obtained prepolymer underwent solid-phase polycondensation using a rotary kiln manufactured by Takasago Industry Co., Ltd. The shape of the chamber in the kiln was roughly a regular hexagon with sides each being 500 mm in length and a total length of 3500 mm. 150 kg of the prepolymer was packed into the kiln. Nitrogen was flowed therein at 15 Nm$^3$/hour, the revolution speed was set at 2 rpm, the temperature in the heater was increased from room temperature to 400° C. over 5 hours, and the prepolymer was held for 12 hours at 400° C. Once it was confirmed that the temperature of the pulverized product had reached 340° C., the heating was stopped. While rotating the rotary kiln, the pulverized product was cooled for 7 hours to obtain the wholly aromatic liquid crystal polyester A.

Production Example 2

Production of Wholly Aromatic Liquid Crystal Polyester B (used in Example 2)

The composition of the raw materials of the wholly aromatic liquid crystal polyester A was changed to 191.4 kg of p-hydroxybenzoic acid (1.386 kilomoles: 63 mol %), 75.8 kg of 4,4'-dihydroxydiphenyl (0.407 kilomoles: 18.5 mol %), and 67.6 kg of terephthalic acid (0.407 kilomoles: 18.5 mol %), and then melt polycondensation and solid-phase polycondensation were carried out in the same manner as in the case of the wholly aromatic liquid crystal polyester A to obtain the wholly aromatic liquid crystal polyester B.

Production Example 3

Production of Wholly Aromatic Liquid Crystal Polyester C (used in Example 3)

The composition of the raw materials of the wholly aromatic liquid crystal polyester A was changed to 206.6 kg of p-hydroxybenzoic acid (1.496 kilomoles: 68 mol %), 65.5 kg of 4,4'-dihydroxydiphenyl (0.352 kilomoles: 16 mol %), and 58.5 kg of terephthalic acid (0.352 kilomoles: 16 mol %), and then melt polycondensation and solid-phase polycondensation were carried out in the same manner as in the case of the wholly aromatic liquid crystal polyester A to obtain the wholly aromatic liquid crystal polyester C.

Production Example 4

Production of Wholly Aromatic Liquid Crystal Polyester D (used in Comparative Example 1)

The composition of the raw materials of the wholly aromatic liquid crystal polyester A was changed to 151.9 kg of p-hydroxybenzoic acid (1.1 kilomoles: 50 mol %), 102.4 kg of 4,4'-dihydroxydiphenyl (0.55 kilomoles: 25 mol %), and 91.4 kg of terephthalic acid (0.55 kilomoles: 25 mol %), and then melt polycondensation and solid-phase polycondensation were carried out in the same manner as in the case of the wholly aromatic liquid crystal polyester A to obtain the wholly aromatic liquid crystal polyester D.

Production Example 5

Production of Wholly Aromatic Liquid Crystal Polyester E (used in Comparative Example 4)

The composition of the raw materials of the wholly aromatic liquid crystal polyester A was changed to 227.9 kg of p-hydroxybenzoic acid (1.65 kilomoles: 75 mol %), 51.2 kg of 4,4'-dihydroxydiphenyl (0.275 kilomoles: 12.5 mol %), and 45.7 kg of terephthalic acid (0.275 kilomoles: 12.5 mol %), and then melt polycondensation and solid-phase polycondensation were carried out in the same manner as in the case of the wholly aromatic liquid crystal polyester A to obtain the wholly aromatic liquid crystal polyester E.

Production Example 6

Production of Wholly Aromatic Liquid Crystal Polyester F (used in Comparative Example 5)

The composition of the raw materials of the wholly aromatic liquid crystal polyester A was changed to 167.1 kg of p-hydroxybenzoic acid (1.21 kilomoles: 55 mol %), 92.2 kg of 4,4'-dihydroxydiphenyl (0.495 kilomoles: 22.5 mol %), and 82.2 kg of terephthalic acid (0.495 kilomoles: 22.5 mol %), and then melt polycondensation and solid-phase polycondensation were carried out in the same manner as in the case of the wholly aromatic liquid crystal polyester A to obtain the wholly aromatic liquid crystal polyester F.

Production Example 7

Production of Wholly Aromatic Liquid Crystal Polyester G (used in Example 6)

The composition of the raw materials of the wholly aromatic liquid crystal polyester A was changed to 197.5 kg of p-hydroxybenzoic acid (1.43 kilomoles: 65 mol %), 71.7 kg of 4,4'-dihydroxydiphenyl (0.385 kilomoles: 17.5 mol %), 60.3 kg of terephthalic acid (0.363 kilomoles: 16.5 mol %), and 3.7 kg of isophthalic acid (0.022 kilomoles: 1.0 mol %), and then melt polycondensation and solid-phase polycondensation were carried out in the same manner as in the case of the wholly aromatic liquid crystal polyester A to obtain the wholly aromatic liquid crystal polyester G.

Production Example 8

Production of Wholly Aromatic Liquid Crystal Polyester H (used in Example 7)

The composition of the raw materials of the wholly aromatic liquid crystal polyester A was changed to 197.5 kg of p-hydroxybenzoic acid (1.43 kilomoles: 65 mol %), 67.6 kg of 4,4'-dihydroxydiphenyl (0.363 kilomoles: 16.5 mol %), 64.0 kg of terephthalic acid (0.385 kilomoles: 17.5 mol %), and 2.4 kg of hydroquinone (0.022 kilomoles: 1.0 mol %), and then melt polycondensation and solid-phase polycondensation were carried out in the same manner as in the case of the wholly aromatic liquid crystal polyester A to obtain the wholly aromatic liquid crystal polyester H.

The following commercially-obtained glass fibers were used as is.

PX-1: Glass Fibers (chopped glass fibers), manufactured by Asahi Fiber Glass Co., Ltd. (aspect ratio of 350, number average fiber diameter of 10 μm, number average fiber length of 3.5 mm, specific gravity of 2.54)

Production of Wholly Aromatic Liquid Crystal Polyester Resin Compositions

Using a wholly aromatic liquid crystal polyester and glass fibers in the compounding proportions shown in Table 1, a wholly aromatic liquid crystal polyester resin and a certain amount of glass fibers were premixed in a ribbon blender. This mixture was charged from the hopper of a twin-screw extruder (KTX-46 manufactured by Kobe Steel Ltd.), and melt-kneaded at a cylinder maximum temperature of 410° C. to obtain a pellet.

Measurement of the Length of the Glass Fibers in the Wholly Aromatic Liquid Crystal Polyester Resin Compositions About 5 g of the composition pellet were ashed in a crucible. Then, 100 mg of the remaining glass fibers were collected, and dispersed in soapy water. Using a dropper, 1 to 2 drops of the resultant dispersion was placed on a glass slide. The dispersion was observed under a microscope, and a photograph thereof was taken. The fiber lengths of 500 of the glass fibers projected on that photograph were measured to determine the number average fiber length.

Evaluation of Damping Properties etc. as an Optical Pickup Lens Holder:

Test Piece From each resin composition pellet, five test pieces for the following tests were molded using an injection molder (SG-25, manufactured by Sumitomo Heavy Industries, Ltd.) at a cylinder temperature of 410° C.

Testing Methods:

(1) Secondary Resonant Frequency, Loss Coefficient

Measurement was conducted according to JIS G 0602 on a test piece with a 12.7 mm width, 0.3 mm thickness, and 40 mm length. One end of this test piece was attached to a vibration machine from Brüel & Kjær so that the test piece had an effective length of 20 mm. Measurement was then carried out by a laser vibration meter from Polytec. The frequency at the secondary resonance point was taken as the resonant frequency, and the loss coefficient at that point was determined by a half-width method.

(2) Specific Gravity

Specific gravity was measured using a 65 mm×12.7 mm×3.0 mm injection molded article according to ASTM D790.

(3) Moldability (Molded Article Appearance)

The moldability of a test piece with a 12.7 mm width, 0.3 mm thickness, and 50 mm length was observed using a magnifying glass, whereby the presence of surface peeling, such as fibrils on the surface, and surface roughness due to fluidity defects was confirmed.

The evaluation results of each of the injection molded articles made of respective resin compositions are shown in Table 1.

TABLE 1

| | Liquid Crystal Polymer Composition | | | | | | Glass Fiber | | | | Resonance Properties | |
|---|---|---|---|---|---|---|---|---|---|---|---|---|
| | | | | | | | Compounding Amount (parts by mass) | Number Average Length in the Composition (μm) | Specific Gravity | Molded Surface Roughness | Resonant Frequency | Loss Coefficient |
| | Type | HBA | BP | TPA | IPA | HQ | | | | | | |
| Example 1 | A | 65 | 17.5 | 17.5 | | | 10.3 | 160 | 1.45 | No | 2700 | 0.18 |
| Example 2 | B | 63 | 18.5 | 18.5 | | | 10.3 | 160 | 1.45 | No | 2600 | 0.17 |
| Example 3 | C | 68 | 16 | 16 | | | 10.3 | 160 | 1.45 | No | 2700 | 0.16 |
| Example 4 | A | 65 | 17.5 | 17.5 | | | 7 | 180 | 1.43 | No | 2600 | 0.18 |
| Example 5 | A | 65 | 17.5 | 17.5 | | | 18 | 140 | 1.49 | No | 2700 | 0.16 |
| Example 6 | G | 65 | 17.5 | 16.5 | 1.0 | | 10.3 | 160 | 1.45 | No | 2600 | 0.16 |
| Example 7 | H | 65 | 16.5 | 17.5 | | 1.0 | 10.3 | 160 | 1.45 | No | 2700 | 0.18 |
| Comparative Example 1 | D | 50 | 25 | 25 | | | 10.3 | 160 | 1.49 | No | 2400 | 0.13 |
| Comparative Example 2 | A | 65 | 17.5 | 17.5 | | | 22 | 130 | 1.51 | No | 2800 | 0.14 |
| Comparative Example 3 | A | 65 | 17.5 | 17.5 | | | 0 | — | 1.39 | Yes | — | — |
| Comparative Example 4 | E | 75 | 12.5 | 12.5 | | | 10.3 | 160 | 1.45 | No | 2200 | 0.11 |
| Comparative Example 5 | F | 55 | 22.5 | 22.5 | | | 10.3 | 160 | 1.45 | No | 2300 | 0.13 |

The compounded amount of the glass fiber is given in parts by mass with respect to 100 parts by mass of the liquid crystal polymer.

As shown in Table 1, the wholly aromatic polyester resin compositions of Examples 1 to 7 produced according to the present invention exhibited good moldability. The obtained injection molded articles had a specific gravity in the desired range of 1.40 to 1.50, good secondary resonant frequency and loss coefficient results, and excellent damping properties. In contrast, the resin compositions and molded articles of Comparative Examples 1, 4, and 5, which used the wholly aromatic liquid crystal polyesters D, E, and F that did not fulfill the requirements of the present invention, and the resin compositions and molded articles of Comparative Examples 2 and 3, which although they used the wholly aromatic liquid crystal polyester A which did fulfill the requirements of the present invention, had a compounded amount of glass fiber which was beyond the range of the present invention, had a specific gravity beyond the desired range, or one or both of moldability and damping properties were inferior to the products produced according to the present invention.

INDUSTRIAL APPLICABILITY

The molded products of the wholly aromatic liquid crystal polyester resin composition of the present invention are useful as a molding material for an optical pickup lens holder having a thin wall section. With the increasing volume and recording/reading speed of information handled by recent digital disc drive apparatuses, the wholly aromatic liquid crystal polyester resin composition of the present invention is especially excellent as a molding material for an optical pickup lens holder which has strict requirements for damping properties. Among these, the wholly aromatic liquid crystal polyester resin composition of the present invention may be preferably used as a molding material for an optical pickup holder for short type pickups for use in high-speed DVD systems and playback pickups for use in Blu-ray systems. The obtained optical pickup lens holder has excellent damping performance.

The invention claimed is:

1. A wholly aromatic liquid crystal polyester resin composition for injection molding, formed by melt-kneading 100 parts by mass of a wholly aromatic liquid crystal polyester resin, and 5 to 20 parts by mass of glass fibers having a number average diameter of 5 to 20 μm and an aspect ratio of 5 or more, the wholly aromatic liquid crystal polyester resin being formed by polycondensation of 60 to 70 mol % of p-hydroxybenzoic acid, 10 to 20 mol % of terephthalic acid, 10 to 20 mol % of 4,4'-dihydroxydiphenyl, and 0 to 5 mol % of one or both of isophthalic acid and hydroquinone, including for each of these a derivative having an acylated phenolic hydroxyl group or a phenyl ester derivative obtained from a phenol, the combination totaling 100 mol %.

2. The wholly aromatic liquid crystal polyester resin composition for injection molding according to claim 1, characterized in that the wholly aromatic liquid crystal polyester resin composition has a specific gravity of 1.40 to 1.50, and the glass fibers in the composition have a number average length of 200 μm or less.

3. An optical pickup lens holder formed by injection molding the wholly aromatic liquid crystal polyester resin composition for injection molding according to claim 1.

4. An optical pickup lens holder formed by injection molding the wholly aromatic liquid crystal polyester resin composition for injection molding according to claim 2.

* * * * *